(12) United States Patent
Wagner et al.

(10) Patent No.: US 11,420,329 B2
(45) Date of Patent: Aug. 23, 2022

(54) PROCESSING SYSTEMS AND METHODS FOR PROVIDING PROCESSING OF A VARIETY OF OBJECTS

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 103 days.

(21) Appl. No.: 16/775,798

(22) Filed: Jan. 29, 2020

(65) Prior Publication Data
US 2020/0164531 A1    May 28, 2020

Related U.S. Application Data

(63) Continuation of application No. 15/348,498, filed on Nov. 10, 2016, now Pat. No. 10,625,432.
(Continued)

(51) Int. Cl.
*B25J 9/16* (2006.01)
*G05B 19/418* (2006.01)
(Continued)

(52) U.S. Cl.
CPC ............... *B25J 9/1669* (2013.01); *B07C 3/18* (2013.01); *B07C 5/36* (2013.01); *B25J 9/0093* (2013.01);
(Continued)

(58) Field of Classification Search
CPC ... G05B 19/4183; B25J 9/1669; B25J 9/0093; B25J 9/1697; B25J 9/1612
See application file for complete search history.

(56) References Cited

U.S. PATENT DOCUMENTS 2,853,333 A    9/1958 Littell
3,005,652 A    10/1961 Helm
(Continued)

FOREIGN PATENT DOCUMENTS

CA    2928645 A1    4/2015
CN    102922521 A    2/2013
(Continued)

OTHER PUBLICATIONS

Examiner's Report issued by the Innovation, Science and Economic Development Canada (Canadian Intellectual Property Office) in related Canadian Patent Application No. 3,107,257 dated Mar. 18, 2022, 6 pages.
(Continued)

*Primary Examiner* — Thomas Randazzo
(74) *Attorney, Agent, or Firm* — Gesmer Updegrove LLP

(57) ABSTRACT

A sortation system is disclosed that includes a programmable motion device including an end effector, a perception system for recognizing any of the identity, location, and orientation of an object presented in a plurality of objects, a
(Continued)

grasp selection system for selecting a grasp location on the object, the grasp location being chosen to provide a secure grasp of the object by the end effector to permit the object to be moved from the plurality of objects to one of a plurality of destination locations, and a motion planning system for providing a motion path for the transport of the object when grasped by the end effector from the plurality of objects to the one of the plurality of destination locations, wherein the motion path is chosen to provide a path from the plurality of objects to the one of the plurality of destination locations.

33 Claims, 12 Drawing Sheets

Related U.S. Application Data

(60) Provisional application No. 62/277,234, filed on Jan. 11, 2016, provisional application No. 62/255,069, filed on Nov. 13, 2015.

(51) Int. Cl.
*B25J 9/00* (2006.01)
*B07C 3/18* (2006.01)
*B07C 5/36* (2006.01)
*B25J 19/04* (2006.01)

(52) U.S. Cl.
CPC ........... *B25J 9/1612* (2013.01); *B25J 9/1664* (2013.01); *B25J 9/1687* (2013.01); *B25J 9/1697* (2013.01); *B25J 19/04* (2013.01); *G05B 19/4183* (2013.01); *G05B 2219/32037* (2013.01); *G05B 2219/39106* (2013.01); *G05B 2219/39295* (2013.01); *G05B 2219/39476* (2013.01); *G05B 2219/39484* (2013.01); *G05B 2219/39504* (2013.01); *G05B 2219/39548* (2013.01); *G05B 2219/40053* (2013.01); *G05B 2219/40078* (2013.01); *G05B 2219/40116* (2013.01); *G05B 2219/40538* (2013.01); *G05B 2219/45045* (2013.01); *Y02P 90/02* (2015.11)

(56) References Cited

U.S. PATENT DOCUMENTS

| | | |
|---|---|---|
| 3,195,941 A | 7/1965 | Morey |
| 3,637,249 A | 1/1972 | Kuhl et al. |
| 4,389,064 A | 6/1983 | Laverriere |
| 4,557,659 A | 12/1985 | Scaglia |
| 4,786,847 A | 11/1988 | Daggett et al. |
| 4,828,304 A | 5/1989 | No et al. |
| 4,896,357 A | 1/1990 | Hatano et al. |
| 5,207,465 A | 5/1993 | Rich |
| 5,244,338 A | 9/1993 | White |
| 5,752,729 A | 5/1998 | Crozier et al. |
| 5,794,789 A | 8/1998 | Payson et al. |
| 5,865,487 A | 2/1999 | Gore et al. |
| 6,015,174 A | 1/2000 | Raes et al. |
| 6,060,677 A | 5/2000 | Ulrichsen et al. |
| 6,244,640 B1 | 6/2001 | Le Bricquer et al. |
| 6,721,444 B1* | 4/2004 | Gu .................... G06T 7/97 382/218 |
| 6,817,639 B2 | 11/2004 | Schmalz et al. |
| 7,313,464 B1* | 12/2007 | Perreault ............ B25J 9/1666 700/262 |
| 7,474,939 B2* | 1/2009 | Oda .................... B25J 15/00 414/744.1 |
| 7,677,622 B2 | 3/2010 | Dunkmann et al. |
| 8,070,203 B2 | 12/2011 | Schaumberger |
| 8,132,835 B2 | 3/2012 | Ban et al. |
| 8,267,386 B2 | 9/2012 | Schaaf et al. |
| 8,874,270 B2 | 10/2014 | Ando |
| 8,936,291 B2 | 1/2015 | Yasuda et al. |
| 9,102,053 B2 | 8/2015 | Suzuki |
| 9,102,055 B1 | 8/2015 | Konolige et al. |
| 9,227,323 B1* | 1/2016 | Konolige ............... B25J 9/1697 |
| 9,259,844 B2* | 2/2016 | Xu ........................ B25J 9/1692 |
| 9,266,237 B2 | 2/2016 | Nomura |
| 9,283,680 B2* | 3/2016 | Yasuda .................. G06V 20/64 |
| 9,486,926 B2 | 11/2016 | Kawano |
| 9,492,923 B2 | 11/2016 | Wellman et al. |
| 9,604,363 B2* | 3/2017 | Ban ...................... B25J 9/0093 |
| 9,623,570 B1 | 4/2017 | Krahn et al. |
| 9,656,813 B2 | 5/2017 | Dunkmann et al. |
| 9,687,982 B1* | 6/2017 | Jules ..................... B25J 9/1612 |
| 9,687,983 B1* | 6/2017 | Prats ..................... G06V 20/58 |
| 2001/0056313 A1 | 12/2001 | Osborne, Jr. |
| 2002/0147568 A1 | 10/2002 | Wenzel et al. |
| 2003/0038491 A1 | 2/2003 | Schmalz et al. |
| 2004/0232716 A1 | 11/2004 | Reed et al. |
| 2008/0181485 A1* | 7/2008 | Beis ...................... B25J 9/1697 382/209 |
| 2010/0109360 A1 | 5/2010 | Meisho |
| 2010/0125361 A1 | 5/2010 | Mougin et al. |
| 2010/0175487 A1 | 7/2010 | Sato |
| 2010/0234857 A1 | 9/2010 | Itkowitz et al. |
| 2011/0320036 A1 | 12/2011 | Freudelsperger |
| 2013/0054029 A1* | 2/2013 | Huang ................... G05D 1/0038 901/30 |
| 2013/0110280 A1 | 5/2013 | Folk |
| 2013/0129464 A1 | 5/2013 | Regan et al. |
| 2013/0166061 A1 | 6/2013 | Yamamoto |
| 2013/0245824 A1 | 9/2013 | Barajas |
| 2013/0343640 A1* | 12/2013 | Buehler ................. G06F 17/00 382/155 |
| 2013/0345872 A1 | 12/2013 | Brooks et al. |
| 2014/0005831 A1 | 1/2014 | Naderer et al. |
| 2014/0067121 A1 | 3/2014 | Brooks et al. |
| 2014/0067127 A1 | 3/2014 | Gatou |
| 2014/0195979 A1* | 7/2014 | Branton ................ G06F 3/0488 715/810 |
| 2014/0298231 A1* | 10/2014 | Saito ..................... G06F 3/0484 715/771 |
| 2014/0305847 A1* | 10/2014 | Kudrus ................. B65D 25/205 209/552 |
| 2015/0057793 A1 | 2/2015 | Kawano |
| 2015/0073589 A1 | 3/2015 | Khodl et al. |
| 2015/0081090 A1 | 3/2015 | Dong |
| 2015/0190925 A1* | 7/2015 | Hoffman ................ B25J 9/1689 901/47 |
| 2015/0224650 A1 | 8/2015 | Xu et al. |
| 2015/0306634 A1 | 10/2015 | Maeda et al. |
| 2015/0306770 A1 | 10/2015 | Mittal et al. |
| 2015/0328779 A1 | 11/2015 | Bowman et al. |
| 2015/0346708 A1 | 12/2015 | Mattern et al. |
| 2015/0352717 A1 | 12/2015 | Mundt et al. |
| 2015/0352721 A1* | 12/2015 | Wicks .................... B25J 9/1687 700/228 |
| 2015/0375398 A1 | 12/2015 | Penn et al. |
| 2015/0375401 A1 | 12/2015 | Dunkmann et al. |
| 2016/0075521 A1 | 3/2016 | Puchwein et al. |
| 2016/0101526 A1 | 4/2016 | Saito et al. |
| 2016/0136816 A1 | 5/2016 | Pistorino |
| 2016/0167227 A1 | 6/2016 | Wellman et al. |
| 2016/0221187 A1 | 8/2016 | Bradski et al. |
| 2016/0243704 A1 | 8/2016 | Vakanski et al. |
| 2016/0271805 A1 | 9/2016 | Kuolt et al. |
| 2016/0347545 A1 | 12/2016 | Lindbo et al. |
| 2016/0379076 A1 | 12/2016 | Nobuoka et al. |
| 2017/0024896 A1 | 1/2017 | Houghton et al. |
| 2017/0050315 A1 | 2/2017 | Sileane |
| 2017/0066597 A1 | 3/2017 | Hiroi |
| 2017/0080566 A1 | 3/2017 | Stubbs et al. |
| 2017/0106532 A1* | 4/2017 | Wellman ............... B25J 9/1602 |
| 2018/0085922 A1* | 3/2018 | Ooba .................... B25J 9/1679 |

(56) References Cited

U.S. PATENT DOCUMENTS

| | | | | |
|---|---|---|---|---|
| 2020/0189105 | A1* | 6/2020 | Wen | B25J 9/1669 |
| 2020/0331144 | A1* | 10/2020 | Huang | B25J 9/1679 |

FOREIGN PATENT DOCUMENTS

| | | |
|---|---|---|
| CN | 103464383 A | 12/2013 |
| CN | 103645724 A | 3/2014 |
| CN | 203955558 U | 11/2014 |
| DE | 3810989 A1 | 8/1989 |
| DE | 10121344 A1 | 11/2002 |
| DE | 10319253 A1 | 12/2004 |
| DE | 102007028680 A1 | 12/2008 |
| DE | 102007038834 A1 | 2/2009 |
| DE | 102010002317 A1 | 8/2011 |
| DE | 102012102333 A1 | 9/2013 |
| EP | 0317020 A2 | 5/1989 |
| EP | 1256421 A1 | 11/2002 |
| EP | 2233400 A1 | 9/2010 |
| EP | 2960024 A2 | 12/2015 |
| JP | 769470 A | 3/1995 |
| JP | 2010201536 A | 9/2010 |
| JP | 2007182286 A | 7/2019 |
| WO | 2010034044 A2 | 4/2010 |
| WO | 2010099873 A1 | 9/2010 |
| WO | 2014166650 A1 | 10/2014 |
| WO | 2015035300 A1 | 3/2015 |
| WO | 2015118171 A1 | 8/2015 |
| WO | 2015162390 A1 | 10/2015 |

OTHER PUBLICATIONS

Office Action issued by the Innovation, Science and Economic Development Canada in related Canadian Patent Application No. 3,004,711 dated Mar. 10, 2020, 8 pages.
First Office Action, and its English translation, issued by the China National Intellectual Property Administration in related Chinese Patent Application No. 201680066557.2 dated Jul. 28, 2020, 20 pages.
Communication pursuant to Article 94(3) EPC issued by the European Patent Office in related European Patent Application No. 16805614.1 dated Oct. 14, 2020, 6 pages.
Non-Final Office Action issued by the U.S. Patent and Trademark Office dated Aug. 17, 2017 in related U.S. Appl. No. 15/348,498, 20 pages.
Final Office Action issued by the U.S. Patent and Trademark Office dated Mar. 9, 2018 in related U.S. Appl. No. 15/348,498, 25 pages.
Non-Final Office Action issued by the U.S. Patent and Trademark Office dated Sep. 25, 2018 in related U.S. Appl. No. 15/348,498, 28 pages.
International Search Report and Written Opinion issued by the international Searching Authority, the European Patent Office, in related International Application No. PCT/US2016/061414 dated Mar. 22, 2017, 14 pages.
Klingbeil et al., Grasping with application to an autonomous checkout robot, Robotics and Automation (ICRA), 2011 IEEE Inernational Conference On, IEEE, May 9, 2011, pp. 2837-2844.
Cipolla et al., "Visually guided grasping in unstructured environments," Robotics and Autonomous Systems, Elsevier Science Publishers, Amsterdam, NL, vol. 19, No. 3-4, Mar. 1, 1997, pp. 337-346.
Rembold et al., "Object turning for barcode search," Proceedings, 2000 IEEE/RSJ International Conference on Intelligent Robots and Systems (IROS 2000), Oct. 31-Nov. 5, 2000, vol. 2, Oct. 31, 2000 (Oct. 31, 2000), p. 1267.
International Preliminary Report on Patentability issued by the International Bureau of WIPO in related International Application No. PCT/US2016/061414 dated May 15, 2018, 10 pages.
Bohg et al., "Data-Driven Grasp Synthesis-A Su," IEEE Transactions on Robotics, IEEE Service Center, Piscataway, NJ, US, vol. 30, No. 2, Apr. 1, 2014, pp. 289-309.
Final Office Action issued by the U.S. Patent and Trademark Office dated Jun. 9, 2019 in related U.S. Appl. No. 15/348,498, 26 pages.
Liu, et al., "Hand-Arm Coordination for a Tomato Harvesting Robot Based on Commercial Manipulator," Proceeding of the IEEE, international Conference on Robotics and Biomimetics (ROBIO), Shenzhen, China, Dec. 2013, pp. 2715-2720.
Office Action issued by the Innovation, Science and Economic Development Canada in related Canadian Patent Application No. 3,004,711 dated Jun. 17, 2019, 8 pages.
Communication pursuant to Rules 161(1) and 162 EPC issued by the European Patent Office in related European Patent Application No. 16805614.1 dated Jun. 20, 2018, 3 pages.
Hebert, et al., "A Robotic Gripper System for Limp Material Manipulation: Hardware and Software Development and Integration," Proceedings of the 1997 IEEE International Conference on Robotics and Automation, Albuquerque, New Mexico, Apr. 1997, pp. 15-21.
Office Action issued by the Innovation, Science and Economic Development Canada in related Canadian Patent Application No. 3,004,711 dated Oct. 20, 2020, 5 pages.
Notice of Second Office Action and Second Office Action, along with its English translation, issued by the China National Intellectual Property Administration in related Chinese Patent Application No. 201680066557.2 dated Mar. 22, 2021, 17 pages.

* cited by examiner

PROCESSING SYSTEMS AND METHODS FOR PROVIDING PROCESSING OF A VARIETY OF OBJECTS

PRIORITY

The present application is a continuation of U.S. patent application Ser. No. 15/348,498 filed Nov. 10, 2016; which claims priority to U.S. Provisional Patent Application Ser. No. 62/255,069, filed Nov. 13, 2015, as well as to U.S. Provisional Patent Application Ser. No. 62/277,234, filed Jan. 11, 2016, the disclosures of which are hereby incorporated by reference in their entireties.

BACKGROUND

The invention generally relates to sortation systems, and relates in particular to robotic and other sortation systems that are intended to be used in dynamic environments requiring the sortation system to accommodate processing a variety of objects in both homogeneous and heterogeneous arrangements.

Many order fulfillment operations achieve high efficiency by employing a process in which orders are picked from warehouse shelves and placed into bins that are sorted downstream. At the sorting stage individual articles are identified, and multi-article orders are consolidated into a single bin or shelf location so that they may be packed and then shipped to customers. The process of sorting these articles has been done by hand. A human sorter picks an article from an incoming bin, finds the barcode on the object, scans the barcode with a handheld or fixed-mount barcode scanner, determines from the scanned barcode the appropriate bin or shelf location for the article, and then places the article in the so-determined bin or shelf location where all articles for that order go.

There remains a need, therefore, for an object identification, sortation, grasp selection, and motion planning system for a robotic system that is able to accommodate the automated identification and processing of a variety of objects in a variety of orientations.

SUMMARY

In accordance with an embodiment, the invention provides a sortation system for providing processing of homogenous and non-homogenous objects in both structured and cluttered environments. The sortation system includes a programmable motion device including an end effector, a perception system for recognizing any of the identity, location, or orientation of an object presented in a plurality of objects, a grasp selection system for selecting a grasp location on the object, the grasp location being chosen to provide a secure grasp of the object by the end effector to permit the object to be moved from the plurality of objects to one of a plurality of destination locations, and a motion planning system for providing a motion path for the transport of the object when grasped by the end effector from the plurality of objects to the one of the plurality of destination locations, wherein the motion path is chosen to provide a path from the plurality of objects to the one of the plurality of destination locations.

In accordance with another embodiment, the invention provides a sortation system including a programmable motion device for use in an environment that includes an input area containing objects to be processed, and destination locations at which processed objects are to be placed. The sortation system includes a perception system for providing data representative of an image of at least a portion of the input area containing objects to be processed, an end effector for engaging objects in the input area, a grasp location selection system for determining a grasp location for grasping an object in the input area containing objects to be processed, and a grasp direction selection system for determining a grasp direction from which to grasp the object in the input area containing objects to be processed.

In accordance with a further embodiment, the invention provides a sortation method of processing objects received at an input area into destination locations. The method includes the steps of providing data representative of an image of at least a portion of the input area, determining a grasp location for grasping an object in the input area, determining a grasp direction from which to grasp the object in the input area, and engaging the object in the input area using an end effector.

BRIEF DESCRIPTION OF THE DRAWINGS

The following description may be further understood with reference to the accompanying drawings in which.

Figure 1:
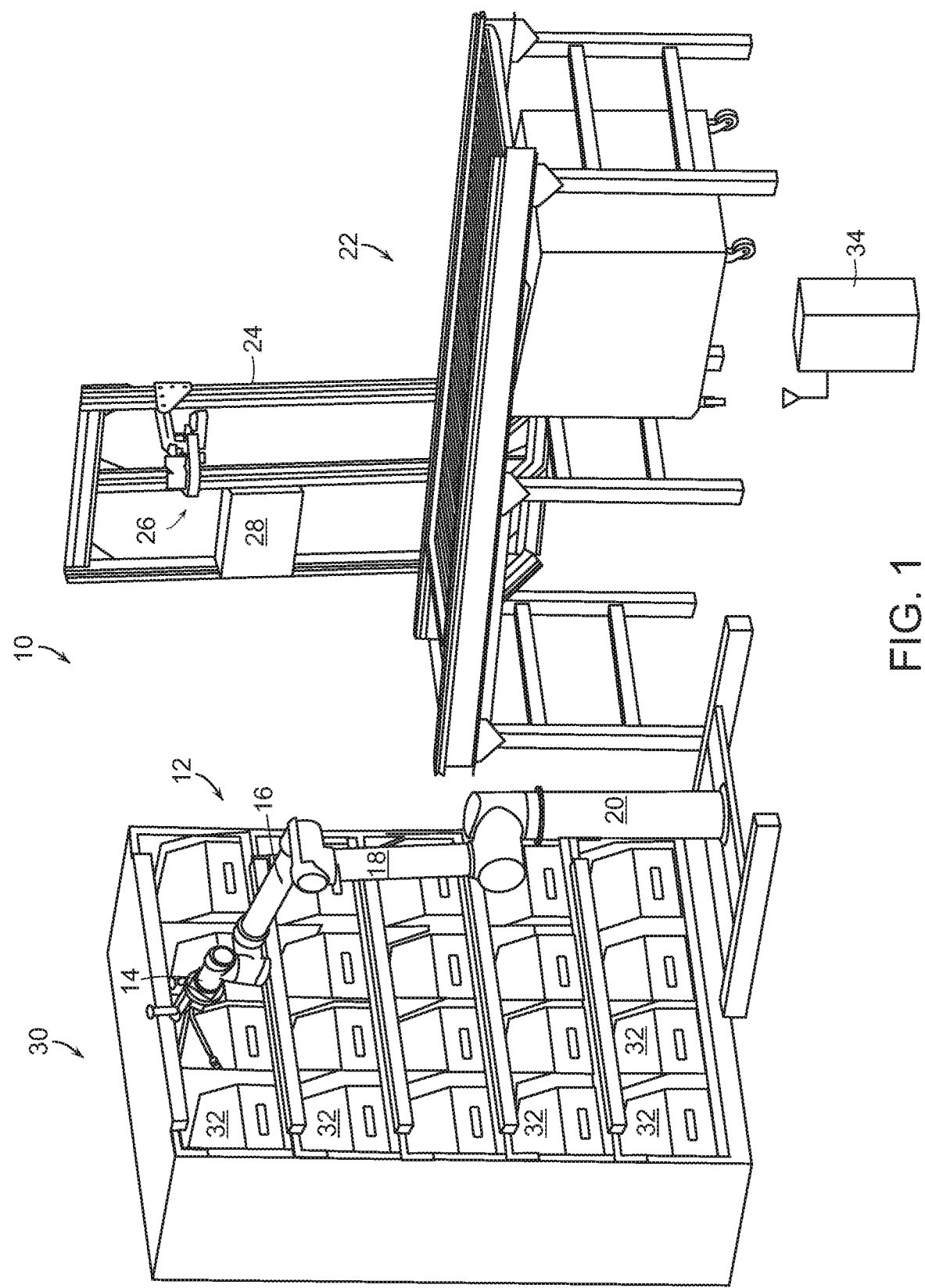
FIG. 1 shows an illustrative diagrammatic view of a sortation system that employs grasp planning in accordance with an embodiment of the present invention.

The drawings are shown for illustrative purposes only.

DETAILED DESCRIPTION

In accordance with an embodiment, the invention provides a novel object scanning system, grasp selection and planning system and motion planning system for the purposes of automatically grasping and moving individual objects in a set for a variety of purposes. In applications such as order fulfillment, articles or goods are collected into heterogeneous sets and need to be sorted. Individual objects need to be identified and then routed to object-specific locations. The described system reliably automates the identification of such objects by employing both automated scanners (e.g., barcode scanner) and a robotic arm.

Sorting for order fulfillment is one application for automatically identifying objects from a heterogeneous object stream. Further, scanners have a wide variety of uses including identifying information for the object (such as a barcode, QR code, UPC code, other identification codes, information read from a label on the object, or size, weight and/or shape information), or tracking parcels. The described system may have many uses in the automatic identification and sortation of objects.

Such a system automates part of the sorting process in conjunction with a robotic pick and place system, and in particular, the step of identifying picked articles. A robotic arm, for example, picks an article from a bin, places the article in front of a scanner, and then, having obtained identification information for the article (such as a barcode, QR codes UPC codes, other identification codes, information read from a label on the object, or size, weight and/or shape information), places the item in the appropriate bin or shelf location. Since certain scanners employ cameras or lasers to scan 1D or 2D symbologies printed on labels affixed to articles, the barcodes must be visible to the scanner's sensors for successful scanning in order to automatically identify items in a heterogeneous stream of arbitrary articles, as in a jumbled set of articles found in a bin.

Further applications for grasping systems of the invention include sortation for a wide variety of applications, including order fulfillment, collection of objects for shipping, and collection of objects for inventory purposes etc. Further, such grasp planning systems of the invention may be used for loading break-packs (organized packages for later breaking apart at a different location), palletization (loading pallets), de-palletization, truck loading, truck unloading etc. As used herein, the term "destination locations" involves the placement of objects at locations for any purpose, not necessarily a final destination, and not necessarily for sortation for order fulfillment.

In accordance with various embodiments, therefore, the invention provides a method for determining the identity of an object from a collection of objects, as well as a method for perceiving the information regarding an object employing one or more perception units (cameras or scanners), and a robotic arm with an end-effector for holding the object. The invention further provides a method for determining a sequence of placements of a robot end-effector so as to minimize the time it takes a configuration of one or more cameras or scanners to successfully scan an object, and a method for scanning the identification information for the object (such as a barcode, QR codes, UPC codes, other identification codes, information read from a label on the object, or size, weight and/or shape information) by employing a scanner as an end-effector on a robotic arm.

An important aspect is the ability to identify identification or mailing information for the objects (such as a barcode, QR codes UPC codes, other identification codes, information read from a label on the object, or size, weight and/or shape information) by employing a programmable motion device such as a robot arm, to pick up individual objects and place them in front of one or more scanners. In accordance with other embodiments, the programmable motion device may include a parallel arm robot (Delta-type arm) or a linear indexing pick and place system. Automated scanning systems would be unable to see, for example, labels or barcodes on objects that are presented in a way that this information is not exposed or visible.

Important components of an automated identification system in accordance with an embodiment of the present invention are shown in FIG. 1. FIG. 1 shows a robotic system 10 that includes an articulated arm 12 that includes an end effector 14 and articulated sections 16, 18 and 20. The articulated arm 12 selects objects from an input area such as a conveyor 22 that are either in a bin on the conveyor 22 or are on the conveyor itself. A stand 24 includes an attached perception unit 26 that is directed toward the conveyor from above the conveyor. The perception unit 26 may include, for example, a 2D or 3D camera, or a scanner such as a laser reflectivity scanner or other type of bar-code reader, or a radio frequency ID scanner.

Figure 2:
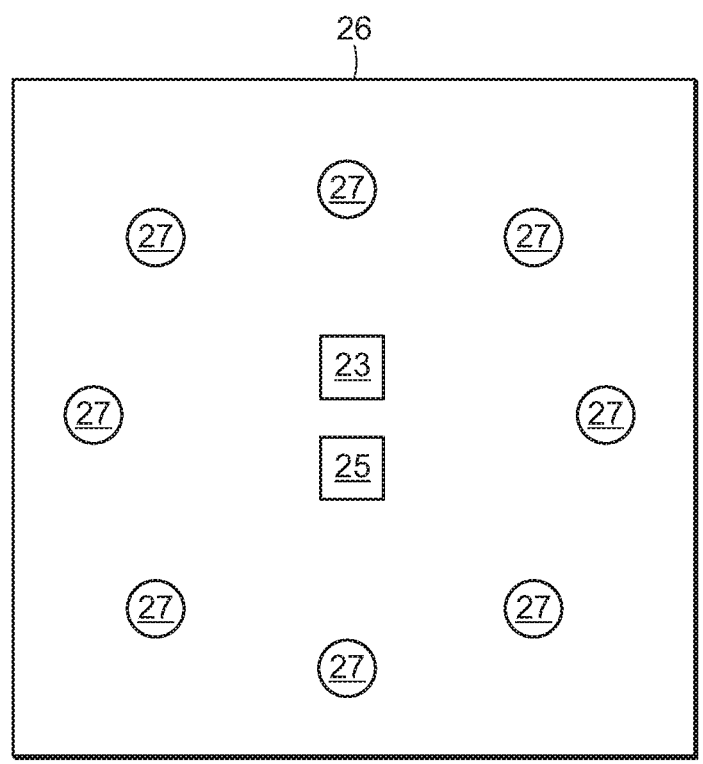
FIG. 2 shows an illustrative diagrammatic bottom view of the perception unit of FIG. 1.

As further shown in FIG. 2, the perception unit 26 may include (on the underside thereof), a camera 23, a depth sensor 25, and lights 27. The depth sensor 25 may provide depth information, that may be used together with the camera image data to determine depth information regarding the various objects in the view. The lights 27 may be used to remove shadows and facilitate the identification of edges of objects, and may be all on during use, or may be illuminated in accordance with desired sequence to assist in object identification.

Again, with reference to FIG. 1, an image display system is also provided as shown at 28 for providing an image of the perception unit's view on a touch screen input device. In accordance with various embodiments, and as discussed in more detail below with reference to FIGS. 3 and 4, the touch screen input device may show the captured image data from the camera 23, and may receive input data provided by a human worker (e.g., by finger placement on the image) that assists the robot system by touching on grasp locations of one or more objects that would be good grasp locations.

The sortation system 10 may further include a robot or other programmable motion device in the sortation environment, a target station 30 that includes a number of bins 32 into which objects may be placed by the robot after identification and grasping. A central computing and control system 34 may communicate with the perception unit 26 and the image display system 28, as well as with the articulated arm 12 via wireless communication, or, in certain embodiments, the central computing and control system may be provided within the base section 20 of the articulated arm.

The system provides in a specific embodiment, an automated article identification system that includes a robotic pick and place system that is able to pick objects up, move them in space, and place them. The system also includes the set of objects themselves to be identified; the manner in which inbound objects are organized, commonly in a heterogeneous pile in a bin or in a line on a conveyor; the manner in which outbound objects are organized, commonly in an array of outbound bins, or shelf cubbies; the manner in which objects are labeled with barcodes or radio-frequency identification tags; a fixed primary scanner operating above the incoming stream of objects; a scanning station where one or more scanners and illuminators are activated when the object is held at the station; and a central computing and control system determines the appropriate location for placing the object, which is dependent on the object's decoded barcode.

As noted, the robotic pick and place system may include a robotic arm equipped with sensors and computing, that when combined exhibits the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic pick and place system. Their size, weight and geometry are assumed to be such that the robotic pick and place system is able to pick, move and place them. These may be any kind of ordered goods, packages, parcels, or other articles that benefit from automated sorting. Each object is associated with a UPC code or other unique object identifier, which identifies the object or its destination.

The invention also provides a robotic system that permits a human worker to assist the robotic system in object sortation, particularly in an environment that presents objects in a non-ordered fashion and in which human workers are also present. As good as a perception system may be, such an environment almost ensures that the robotic system will encounter some configuration of objects that the robotic system cannot handle. In accordance with various embodiments of the invention, it may be desirable to enable the human worker to assist the robotic system.

In accordance with an embodiment of the invention therefore, the invention provides a method that allows a human worker to look up at an image of a collection of objects as the robotic system perceives the collection of objects, and aid the robotic system by identifying one or more grasp locations for one or more objects. The system may also be used to delete bad grasp locations that the robotic system has identified. In addition, the 2D/3D imagery in conjunction with the human worker selected grasp locations can be used as input to machine learning algorithms to help the robotic system learn how to deal with such cases in the future, thereby reducing the need for operator assistance over time.

As discussed above, the system of an embodiment includes a perception system 26 that is mounted above a bin of objects to be sorted, looking down into the bin. A combination of 2D and 3D (depth) data is acquired. The system uses this imagery and a variety of algorithms to generate a set of candidate grasp locations for the objects in the bin.

Figure 3:
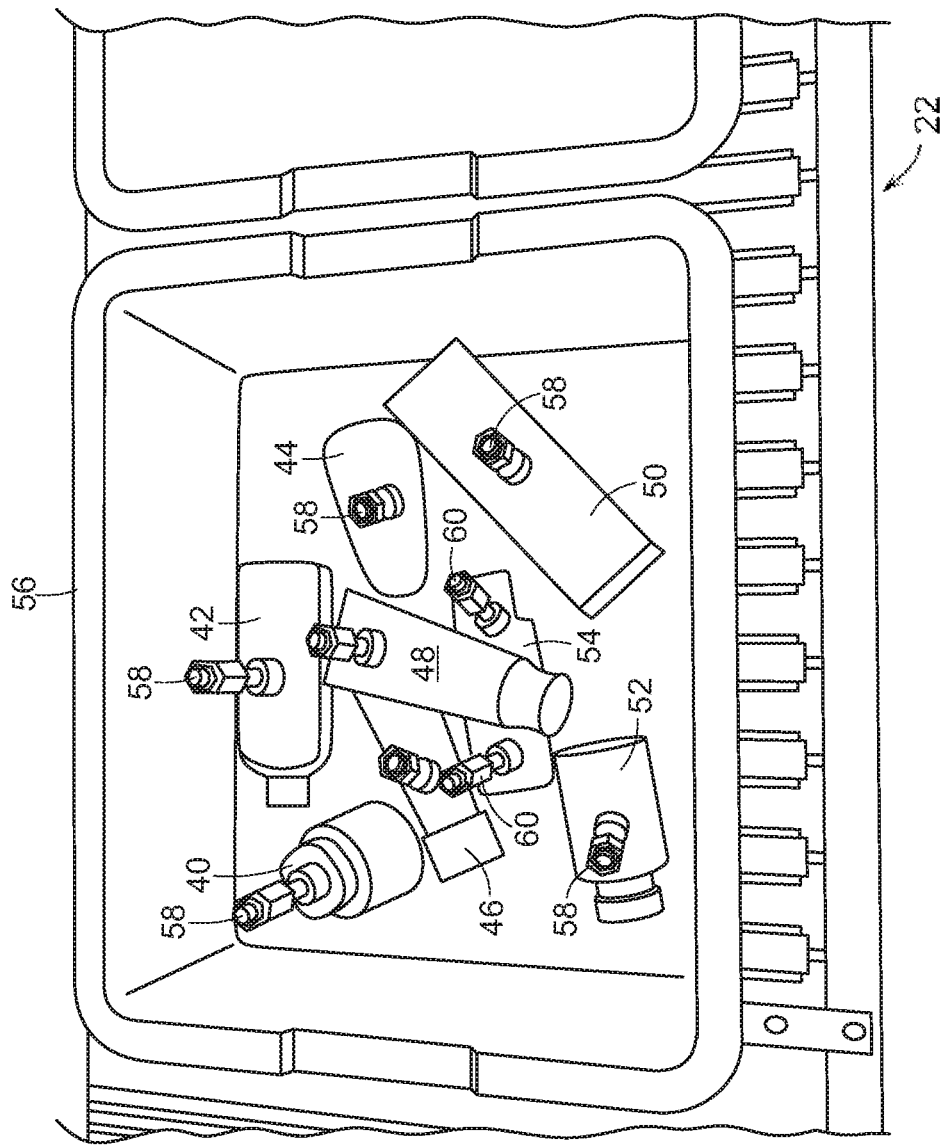
FIG. 3 shows an illustrative diagrammatic image of objects in a bin in a system in accordance with an embodiment of the invention showing good and bad grasp locations.

FIG. 3 shows an image of a camera view from the perception unit 26, and the image may appear on the image display system 28 of FIG. 1 with superimposed images of an end effector seeking to grasp each object 40, 42, 44, 46, 48, 50, 52 and 54 in a bin 56, showing the location of each grasp. Candidate grasp locations 58 are indicated using a 3D model of the robot end effector placed in the location where the actual end effector would go to use as a grasp location as shown in FIG. 3. The image shows several grasp locations 58 that would be considered good (e.g., they are close to the center of mass of the object to provide greater stability during grasp and transport) and they avoid places on an object such as caps, seams etc. where a good vacuum seal might not be available.

The image also shows two grasp locations 60 that are not good grasp locations, where the perception system did not correctly perceive the object 54, and in particular, did not perceive that another object 48 is lying on top of the object 54. The object 54 cannot be fully perceived by the detection system, and as a result, the perception system considers the object 54 to be two different objects and has proposed candidate grasps of such two different objects. If the system executes a grasp at either of the grasp locations 60, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

Figure 4:
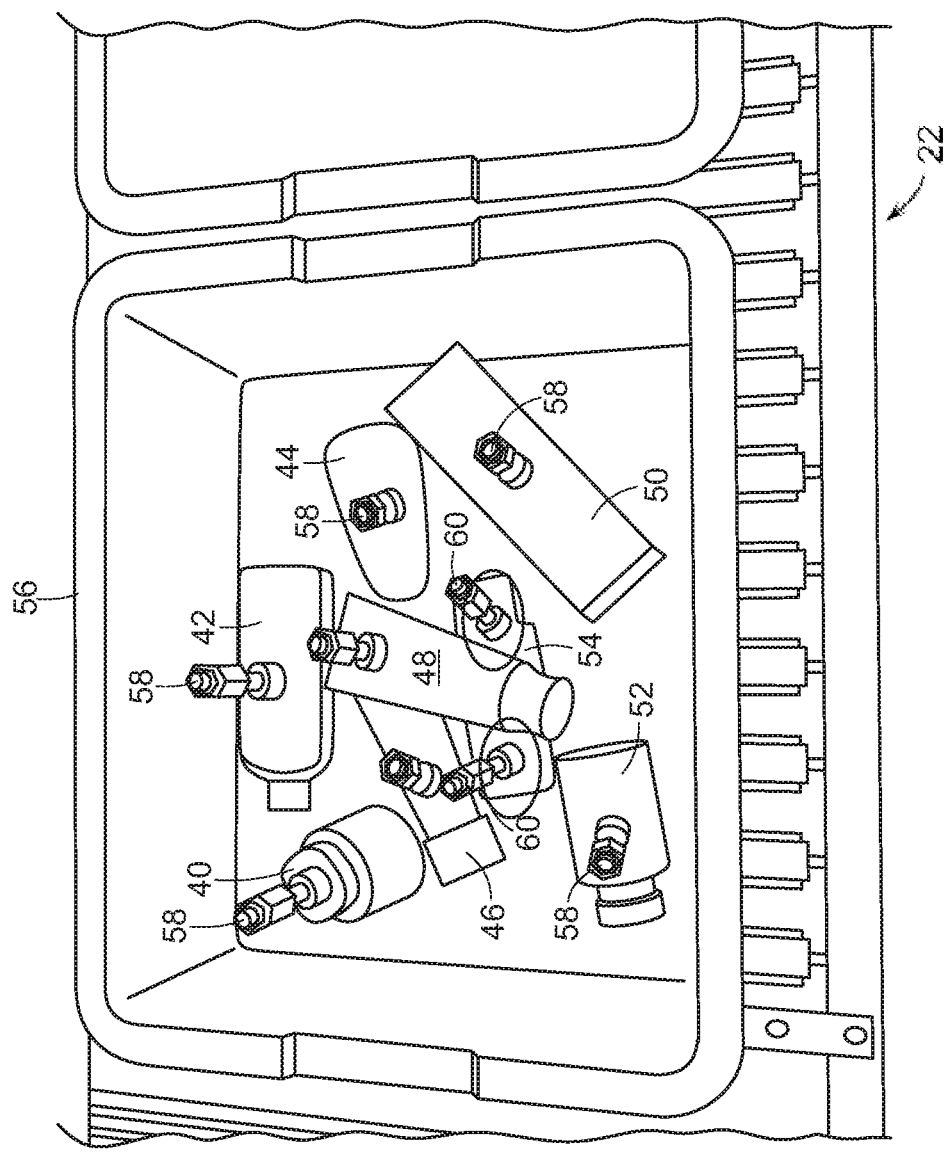
FIG. 4 shows an illustrative diagrammatic image of objects in the bin of FIG. 3 additionally identifying certain bad grasp locations.

As shown in FIG. 4, the bad grasp locations 60 may be easily identified by a human worker that touches the image (that is displayed on a touch screen input device 28), and thereby identify the bad grasp locations 60. The selected locations may, for example, show an indication of having been selected. The bad grasp locations 60 may then be deleted from the processing system 34. Once the sortation system has acquired and moved the object 48, the entire bottom object 54 will become visible to the detection system, and the robotic system will generate a good candidate grasp location.

If a good grasp location is not generated for an object by the robotic system, the human worker may, again using the touch screen interface, select an appropriate grasp location on the touch screen. The sortation system may then queue this human-determined candidate grasp location for that object and execute that grasp location for similar objects during the process of clearing the bin. Every bin image that is modified by a human worker will then be stored and used as input to machine learning algorithms. By identifying bad or good grasp locations on the image, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

In accordance with further embodiments, the system may prompt the human worker with a proposed grasp location, and the person may either confirm that the location is a good selection (e.g., by touching it), or may indicate that the proposed grasp location is not a good location (e.g., by swiping the location—touching and dragging). Following such interaction with a human worker, the system may learn optimal grasp locations for objects that it may come to recognize and know. Further embodiments may involve the use of simulation, either for obtaining feedback from a human worker, or for mapping out various grasp location selections for movement.

Figure 5A:
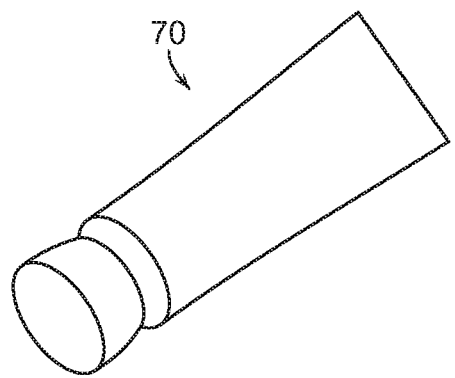
FIGS. 5A and 5B show illustrative diagrammatic views of an object grasp location being selected in accordance with an embodiment of the invention.
Figure 5B:
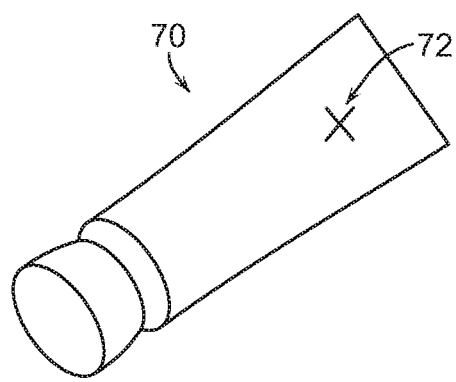

As shown in FIGS. 5A and 5B, the perception system may also identify portions of an object that are the most flat in the generation of good grasp location information. In particular, if an object includes a tubular end and a flat end such as object 70, the system would identify the more flat end as shown at 72 in FIG. 5B. Additionally, the system may select the area of an object where a UPC code appears (e.g., 72), as such codes may be printed on a relatively flat portion of the object.

Figure 6A:
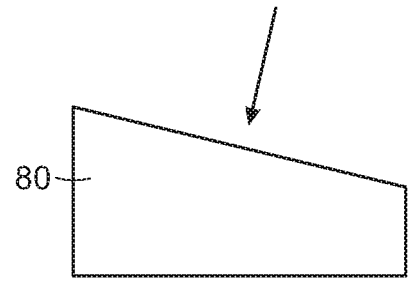
FIGS. 6A and 6B show illustrative diagrammatic views of grasp angle selection in accordance with an embodiment of the invention.
Figure 6B:
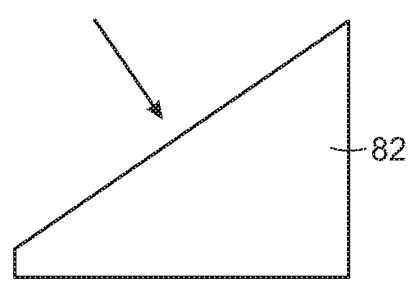
Figure 7A:
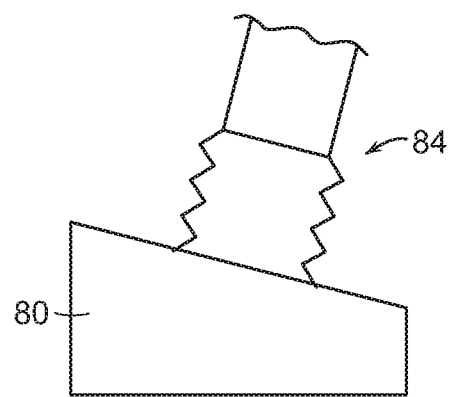
FIGS. 7A and 7B show illustrative diagrammatic views of a gripper approaching objects along selected grasp angles in accordance with an embodiment of the invention.
Figure 7B:
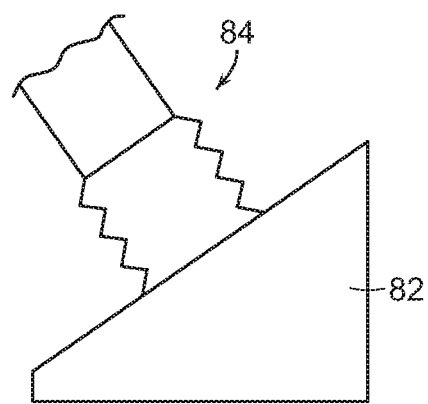

FIGS. 6A and 6B show that for each object 80, 82, the grasp selection system may determine a direction that is normal to the selected flat portion of the object 80, 82. As shown in FIGS. 7A and 7B, the robotic system will then direct the end effector 84 to approach each object 80, 82 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

Figure 8A:
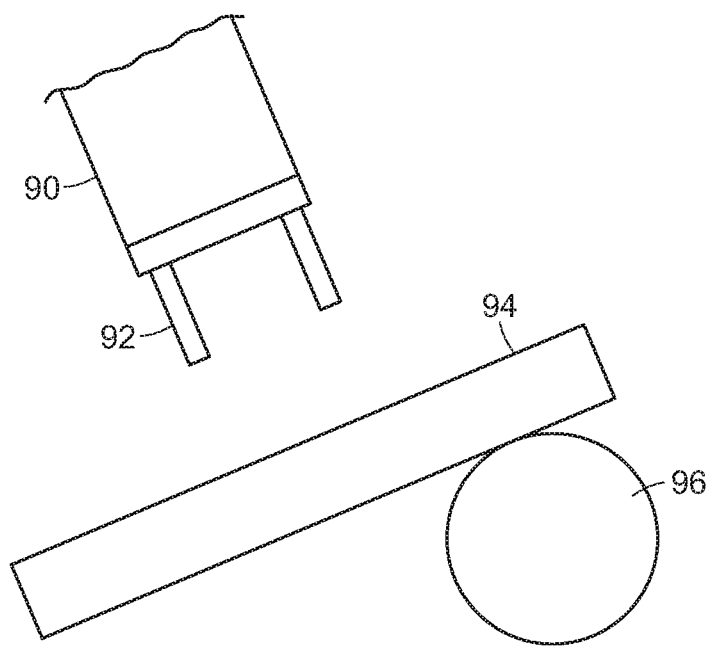
FIGS. 8A and 8B show illustrative diagrammatic views of another type of gripper approaching objects along selected grasp angles in accordance with an embodiment of the invention.
Figure 8B:
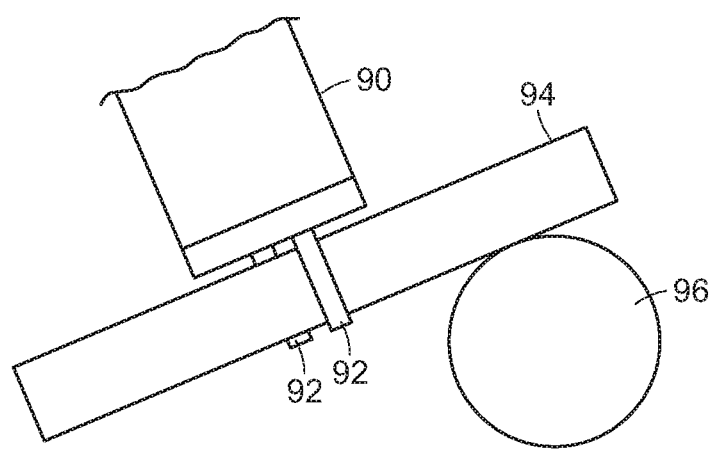

As shown in FIGS. 8A and 8B, a robotic system in accordance with a further embodiment of the invention may include a robotic arm 90 to which is coupled a gripping end effector 92. Similar to the embodiments discussed above, the gripping end effector 92 is programmed to approach an object 94 from an angle that is normal to a surface of the object 94, and the object 94 may be resting on another object 96. FIG. 8A shows the end effector 92 approaching the object 94, and FIG. 8B shows the end effector 92 grasping the object 94.

The invention provides therefore in certain embodiments that grasp optimization may be based on determination of surface normal, i.e., moving the end effector to be normal to the perceived surface of the object (as opposed to vertical or "gantry" picks), and that such grasp points may be chosen using fiducial features as grasp points, such as picking on a barcode, given that barcodes are almost always applied to a flat spot on the object. The invention also provides operator assist, where an object that the system has repeatedly failed to grasp has a correct grasp point identified by a human, as well as operator assist, where the operator identifies bad grasp plans, thus removing them and saving the time of the system attempting to execute them.

In accordance with various embodiments therefore, the invention further provides a sortation system that may learn object grasp locations from experience and human guidance. Systems designed to work in the same environments as human workers will face an enormous variety of objects, poses, etc. This enormous variety almost ensures that the robotic system will encounter some configuration of object (s) that it cannot handle optimally; at such times, it is desirable to enable a human operator to assist the system and have the system learn from non-optimal grasps.

The 2D/3D imagery in conjunction with the human-selected grasp points can be used as input to machine learning algorithms, to help the sortation system learn how to deal with such cases in the future, thereby reducing the need for operator assistance over time. A combination of 2D and 3D (depth) data is acquired, the system uses this imagery and a variety of algorithms to generate a set of candidate grasp points for the objects in the bin.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information, the system uses appearance-based features from depth sensors that may not always be accurate enough to provide sufficient information about graspability. For example, the system can learn the location of fiducials such as barcodes on the object, which can be used as indicator for a surface patch that is flat and impermeable, hence suitable for a suction cup. One such example is shipping boxes and bags, which tend to have the shipping label at the object's center of mass and provide an impermeable surface, as opposed to the raw bag material which might be slightly porous and hence not present a good grasp.

Every bin image that is modified by a human operator will then be stored and used as input to machine learning algorithms. By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

The method as described thus far focuses on providing data for offline learning algorithms or on real-time correction of the robotic system. There is also the possibility of using this method in response to a robotic system asking for help.

There exists the scenario where a sortation system has emptied all objects out of a bin but one. The system has tried and failed several times to grasp this item. At this point, the robotic system can send for help by transmitting the image from its perception system to a human operator. That human operator can, by touching the image, identify the grasp point that the system should use to acquire the object, thereby allowing the human to compensate for the inevitable shortcomings of the perception system.

Figure 9:
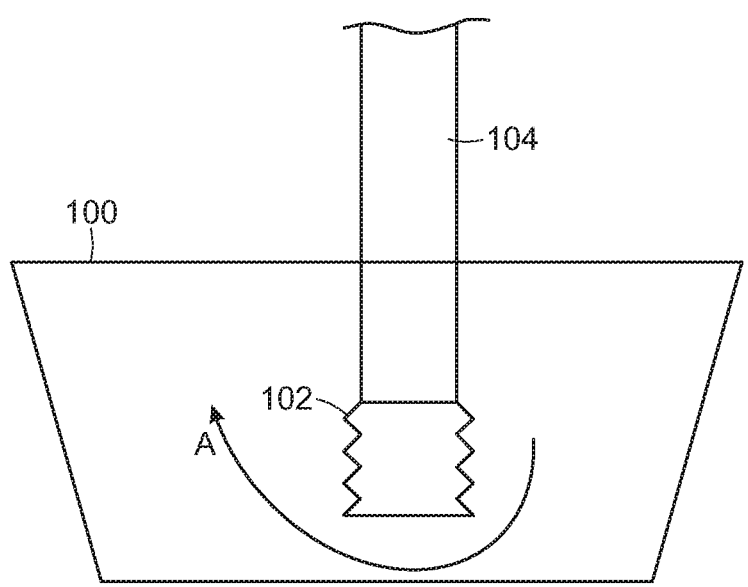
FIG. 9 shows an illustrative diagrammatic view of a robotic arm used to agitate the contents of a bin in accordance with an embodiment of the invention.

In accordance with certain embodiments, the system may also choose to "stir" the presented input objects if the system is not able to achieve a successful grasp after a number of attempts, either prior to human interaction or after following the human's guidance. The action of "stirring" objects will re-arrange objects such that a new set of grasps can be computed, which may lead to successful grasp attempts. For example, if an object is standing upright, presenting itself with a surface that the robot is not able to grasp, the robot may choose to knock the object over in order to pick it from the side. FIG. 9, for example, diagramatically shows a sectional view of an input bin 90, where an end effector 92 of an articulated arm 94 is being moved within the input bin in a circular motion as shown at A to stir any contents of the input bin in order to change the arrangement of objects in the input bin.

Figure 10A:
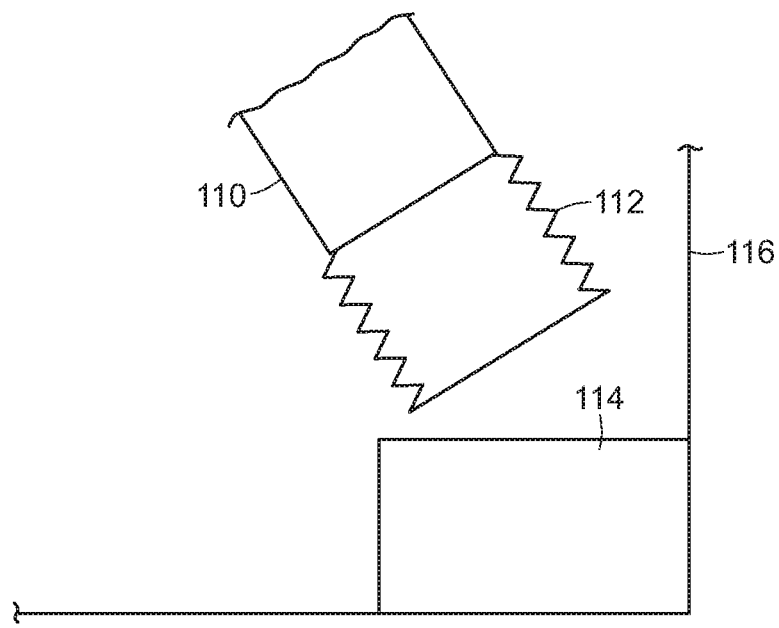
FIGS. 10A and 10B show illustrative diagrammatic views of an object being grasped in accordance with a further embodiment of the present invention.
Figure 10B:
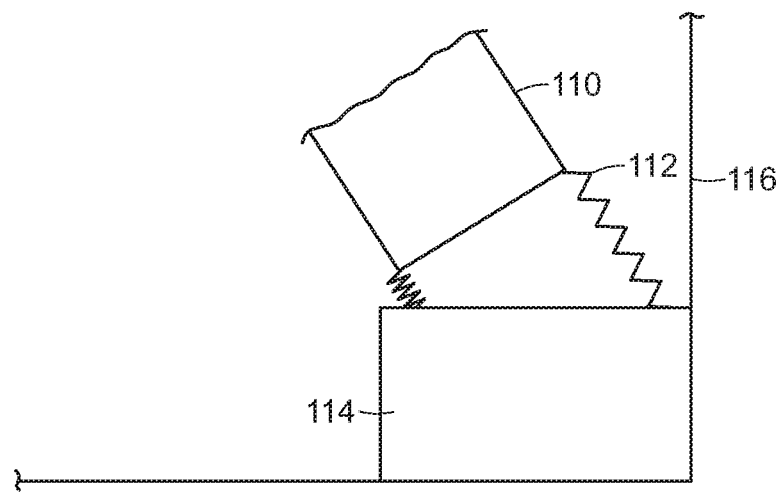

In accordance with a further embodiment of the invention, the system may plan grasp approaches that take into account elements of the environment that may obstruct movement using an optical approach path. For example, and with reference to FIG. 10A, if an object 114 is pushed up against an edge or corner of a bin 116, it may be difficult for the robotic arm 110 to position the end effector 112 directly on top of the object 114. In this case, and with reference to FIG. 10B, the system may direct the robot 110 to approach the object 114 from an angle as shown. The flexible bellows 112 may then accommodate the grasping of the object under vacuum.

Figure 11:
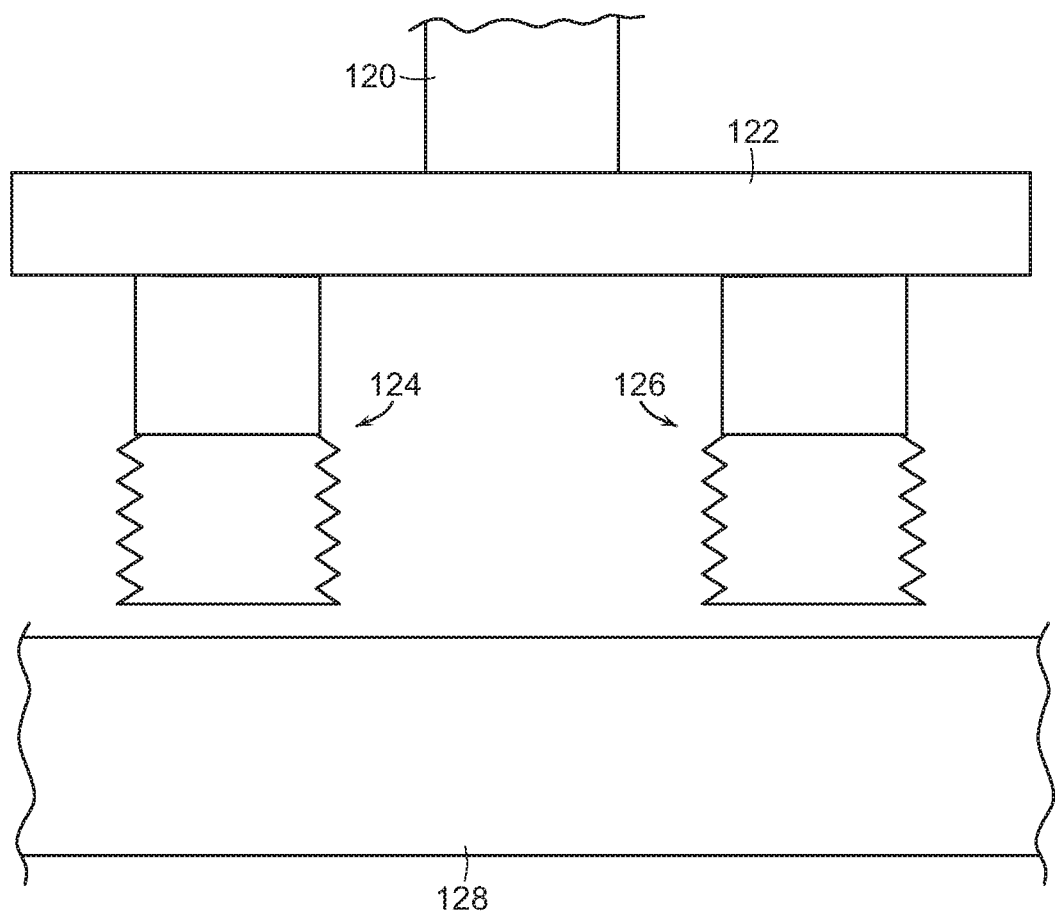
FIG. 11 shows an illustrative diagrammatic view of an end effector in accordance with an embodiment of the present invention that includes more than one gripper.

As shown in FIG. 11, systems in accordance with a further embodiment of the invention may include more than one gripper on a single robotic arm, to facilitate grasping an object that may be particularly large and/or heavy. FIG. 11, for example, shows a robotic arm 120 that includes a multi-gripper end effector 122 having two vacuum bellows 124 and 126. As mentioned above, the multi-gripper end effector 122 may be used to grasp large and/or heavy objects 128, and the grasping approach may be optimized for the object and/or for the environment.

Figure 12:
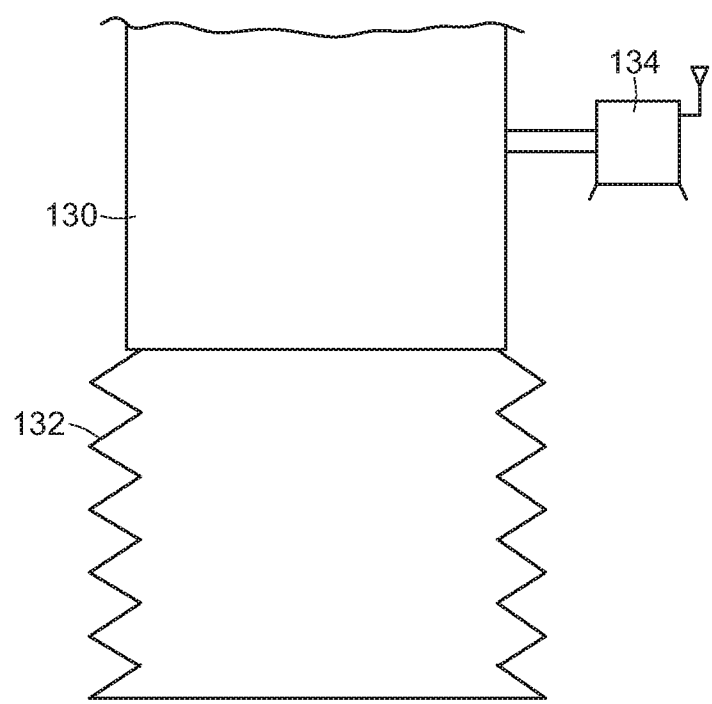
FIG. 12 shows an illustrative diagrammatic view of an end effector in accordance with an embodiment of the invention that includes a camera for a viewing grasp.
Figure 13:
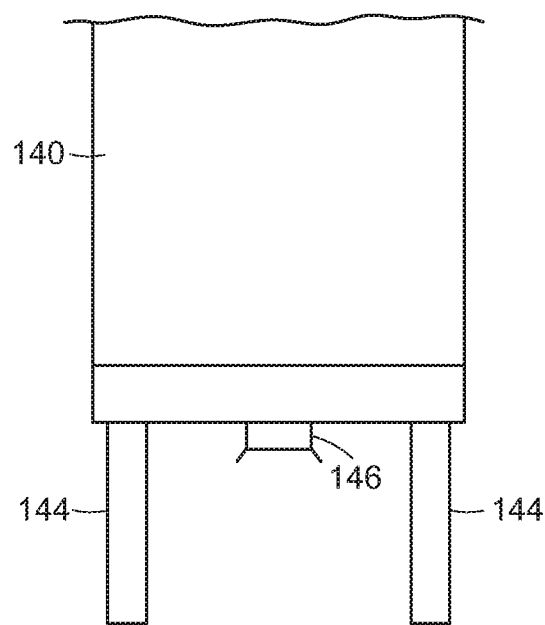
FIG. 13 shows an illustrative diagrammatic view of another end effector in accordance with a further embodiment of the invention that includes a camera for viewing a grasp.
Figure 14:
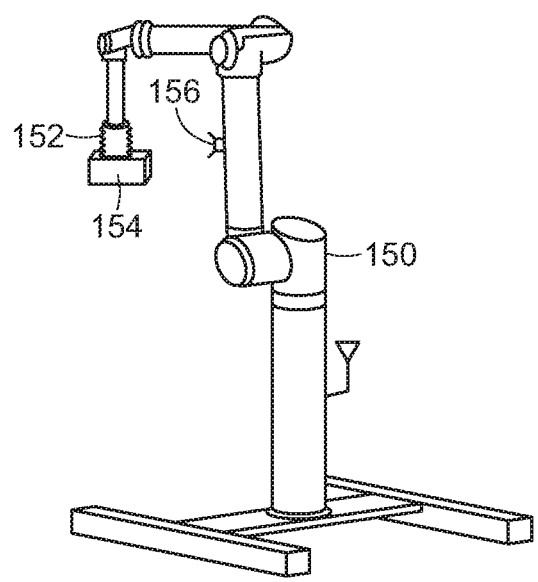
FIG. 14 shows an illustrative diagrammatic view of a sortation system that includes a camera for viewing a grasp in accordance with an embodiment of the present invention.

Systems in accordance with further embodiments of the present invention may also use cameras to check or monitor a grasp. FIG. 12, for example, shows a vacuum bellows gripper 132 on a robotic arm 130 that includes a camera 134 for viewing an object as grasped. FIG. 13 shows a two finger pinch end effector 144 on a robotic arm 140, that includes a camera 146 for viewing an object as it is grasped between the movable fingers 144. In further embodiments, a camera may be provided on the robot but further from the end effector. For example, FIG. 14 shows a robotic system 150 that includes a camera 156 for viewing the end effector 152 as it holds an object 154. In use, the robot may be programmed to move an object once grasped to a home position where it may view the grasp of the object. In other embodiments, the camera may be positioned in the environment and not on the robot.

In further embodiments, the robotic system may also employ motion planning using a trajectory database that is dynamically updated over time, and is indexed by customer metrics. The problem domains contain a mix of changing and unchanging components in the environment. For example, the objects that are presented to the system are often presented in random configurations, but the targets they need to be put into are often fixed and do not change over the entire operation.

One use of the trajectory database is to exploit the unchanging parts of the environment by pre-computing and saving into a database of trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task.

An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Another advantage of the varied set is the ability to address several customer metrics without having to re-plan motions. The database is sorted and indexed by customer metrics like time, robustness, safety, distance to obstacles etc. and given a new customer metric, all the database needs to do is to reevaluate the metric on the existing trajectories, thereby resorting the list of trajectories, and automatically producing the best trajectory that satisfies the new customer metric without having to re-plan motions.

Another advantage is that even if a trajectory is invalid due to changes in the environment or customer metrics, the stored trajectories may serve as seeds for trajectory optimization algorithms, thereby speeding up the generation of new trajectories in new situations. A further advantage is that the database offers a mechanism for different systems to share information remotely or over the cloud. By all indexing into the same database, different systems working in different places can have a common infrastructure for sharing information and planned trajectories.

Those skilled in the art will appreciate that numerous modifications and variations may be made to the above disclosed embodiments without departing from the spirit and scope of the present invention.

What is claimed is:

1. A sortation system comprising:
a programmable motion device including an end effector;
a perception system for recognizing any of the identity, location, and orientation of each of a plurality of objects presented for capturing real time image data of the plurality of objects at an input area; and
a grasp location selection system for selecting grasp locations on the plurality of objects that permits each of the objects to be grasped and moved by the end effector from the plurality of objects to a plurality of destination locations,
wherein the grasp location selection system determines candidate grasp locations on the plurality of objects based on the real time image data of the plurality of objects and displays the real time image data of the plurality of objects on touch screen input device including graphical indications superimposed on the displayed image data that represent the candidate grasp locations on the plurality of objects and angles of approach to the candidate grasp locations,
wherein the grasp location selection system confirms any of the candidate grasp locations responsive to the candidate grasp location being touched on the touch screen input device and deletes any of the candidate grasp locations responsive to the candidate grasp location being swiped on the touch screen input device, and
wherein the end effector of the programmable motion device grasps each of the plurality of objects at the candidate grasp locations confirmed by the grasp location selection system.

2. The sortation system as claimed in claim 1, wherein the real time image data is real time 2D image data that is provided by a two dimensional imaging device.

3. The sortation system as claimed in claim 1, wherein the real time image data is real time 3D image data that is provided by a three dimensional imaging device.

4. The sortation system as claimed in claim 1, wherein a motion path is chosen to avoid excessive physical forces or torques applied to the object during transport while avoiding obstacles in a sortation environment and providing a high speed of transport.

5. The sortation system as claimed in claim 1, wherein the candidate grasp locations are determined responsive to learned information provided by a set of learned experiences in which the sortation system is provided with learned information regarding grasp locations for a plurality of objects.

6. The sortation system as claimed in claim 5, wherein the set of learned experiences is provided by past grasp attempts by the end effector.

7. The sortation system as claimed in claim 1, wherein the perception system further identifies planar or low curvature portions of a surface of an object of the plurality of objects and a direction normal to each identified planar or low curvature portion of the surface of the object.

8. The sortation system as claimed in claim 7, wherein the grasp location selection system selects an approach path toward the object along the direction normal to an identified planar or low curvature portion of the surface of the object.

9. The sortation system as claimed in claim 7, wherein the grasp location selection system selects an approach path toward the object along a direction that is selected to avoid environmental constraints on any movement of the programmable motion device.

10. A sortation system comprising:
a perception system for capturing real time image data of at least a portion of an input area containing a plurality of objects to be processed;
an end effector of a programmable motion device for grasping the objects to be processed in the input area; and
a grasp location selection system for determining a grasp location that permits the end effector to grasp a selected object of the plurality of objects to be processed in the input area,
wherein said grasp location selection system determines a plurality of candidate grasp locations on the plurality of objects based on the real time image data of the plurality of objects and displays the real time image data of the plurality of objects on a touch screen input device with a plurality of graphical indications superimposed on the displayed image data that represents the plurality of candidate grasp locations on the plurality of objects to be processed,
wherein the grasp location selection system confirms any of the candidate grasp locations responsive to a first physical human interaction on the touch screen input device with respect to the candidate grasp location and deletes any of the candidate grasp locations responsive to a second physical human interaction on the touch screen input device with respect to the candidate grasp location,
wherein the end effector of the programmable motion device grasps each of the plurality of objects at the candidate grasp locations confirmed by the grasp location selection system, and
wherein the grasp location selection system determines further candidate grasp locations for other objects that become visible to the perception system responsive to removal of one or more of the plurality of objects from the input area by the programmable motion device.

11. The sortation system as claimed in claim 10, wherein said end effector includes a vacuum source.

12. The sortation system as claimed in claim 10, wherein said perception system includes a camera that is positioned above the input area.

13. The sortation system as claimed in claim 10, wherein the perception system includes any of one or more depth sensors and one or more long range infrared (IR) sensors.

14. The sortation system as claimed in claim 10, wherein the grasp location selection system provides for operator assistance in the event that a grasp location cannot be determined or the end effector is unable to grasp an unknown object of the plurality of objects.

15. The sortation system as claimed in claim 10, wherein a portion of the programmable motion device is configured to agitate the plurality of objects in a bin containing the plurality of objects to be processed in order to create new object orientations for the perception system.

16. The sortation system as claimed in claim 10, wherein the perception system is mounted on at least one of the programmable motion device and the end effector, for viewing grasps.

17. The sortation system as claimed in claim 10, wherein said grasp location selection system determines candidate grasp locations for selected objects to be processed responsive to detection of any of a bar code, a QR code, UPC code, or other product code.

18. The sortation system as claimed in claim 17, wherein said candidate grasp locations are determined to be a location of a bar code, QR code, UPC code or other product code.

19. The sortation system as claimed in claim 10, wherein said grasp location selection system determines the candidate grasp locations for the objects to be processed responsive to learned information provided by a set of learned experiences in which the grasp location selection system is provided with learned information regarding candidate grasp locations for the plurality of objects to be processed.

20. The sortation system as claimed in claim 19, wherein said set of learned experiences is provided by past grasp attempts by the end effector.

21. The sortation system as claimed in claim 10, wherein the grasp location selection system further determines a direction that is normal to a plane that is tangent to a surface of a selected object at a selected grasp location.

22. The sortation system as claimed in claim 21, wherein the end effector is provided with command signals to approach the selected object along the direction that is normal to the plane that is tangent to the surface of the selected object at the selected grasp location.

23. The sortation system as claimed in claim 10, wherein said perception system includes a scanner that is positioned above the input area.

24. The sortation system as claimed in claim 23, wherein the scanner is a laser reflectivity scanner.

25. The sortation system as claimed in claim 23, wherein the scanner is a radio frequency identification (RFID) scanner.

26. A method of processing objects received at an input area into destination locations, said method comprising:
capturing real time image data of at least a portion of the input area containing a plurality of objects to be processed;
determining a grasp location for grasping a first object of the plurality of objects in the input area;
determining a grasp direction from which to grasp the first object in the input area;
determining a grasp location for grasping a second object of the plurality of objects in the input area;

determining a grasp direction from which to grasp the second object in the input area;

displaying the real time image data of the plurality of objects on a touch screen input device including graphical indications superimposed on the displayed image data that represent the grasp location and the grasp direction for each of the first object and the second object;

confirming the grasp location and the grasp direction for any of the first object and the second object responsive to a first physical human interaction on the touch screen input device with respect to the grasp location;

deleting the grasp location and the grasp direction for any of the first object and the second object responsive to a second physical human interaction on the touch screen input device with respect to the grasp location; and grasping any of the first object and the second object at the confirmed grasp location in the input area using a robotic end effector of a programmable motion device.

27. The method as claimed in claim 26, wherein determining the grasp location of the first object includes permitting a human worker to enter the grasp location via a computer-based system.

28. The method as claimed in claim 26, wherein the method further includes stirring the plurality of objects at the input area using a programmable motion device in order to change an arrangement of objects in the input area.

29. The method as claimed in claim 26, wherein determining a grasp location includes detecting any of a bar code, a QR code, UPC code or other product code.

30. The method as claimed in claim 29, wherein the grasp location is selected to be the location of the bar code, the QR code, UPC code or the other product code.

31. The method as claimed in claim 26, wherein determining the grasp location of the first object includes accessing learned information that is provided by a set of learned experiences.

32. The method as claimed in claim 31, wherein the set of learned experiences are provided by past grasp attempts.

33. The method as claimed in claim 31, wherein the set of learned experiences are provided by a human worker that enters grasp locations into a computer-based system.

* * * * *